Sept. 13, 1960 C. PATTY 2,952,140
CONTROL FOR MACHINES DISPENSING FROZEN PRODUCTS
Filed Sept. 9, 1957 2 Sheets-Sheet 1

Clyde Patty,
INVENTOR.

By Todd D. O'Br—
ATTORNEY.

Sept. 13, 1960  C. PATTY  2,952,140
CONTROL FOR MACHINES DISPENSING FROZEN PRODUCTS
Filed Sept. 9, 1957  2 Sheets-Sheet 2
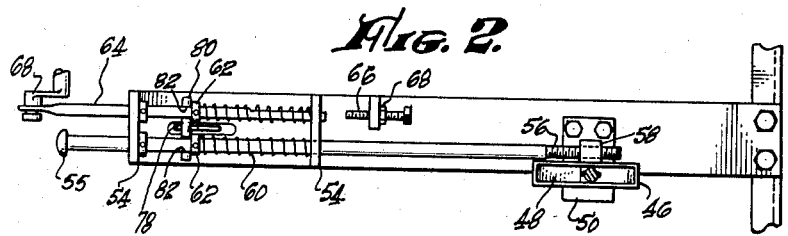
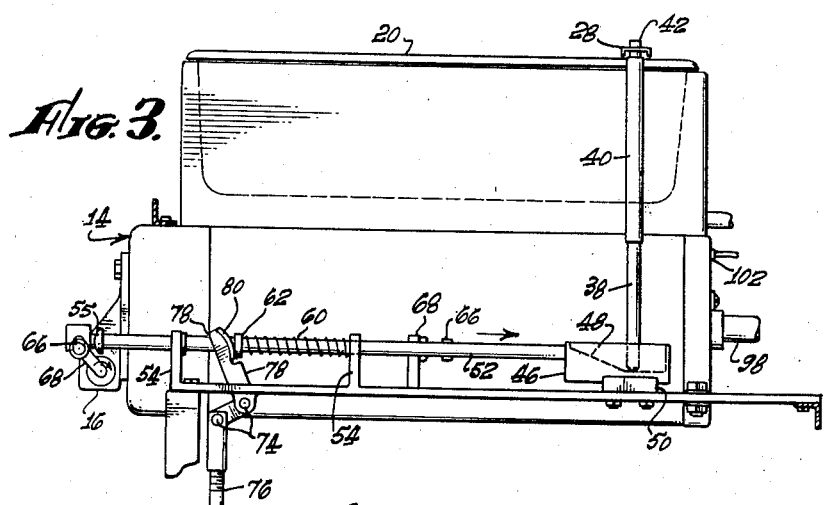
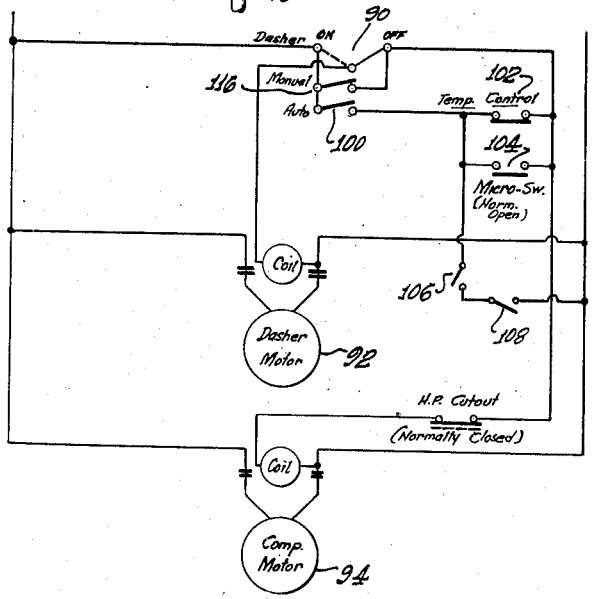
CLYDE PATTY,
INVENTOR.
BY Ted D. O'Brien
ATTORNEY.

United States Patent Office 2,952,140
Patented Sept. 13, 1960

2,952,140
CONTROL FOR MACHINES DISPENSING FROZEN PRODUCTS

Clyde Patty, 4562 St. Charles Place, Los Angeles 19, Calif.

Filed Sept. 9, 1957, Ser. No. 682,978

5 Claims. (Cl. 62—342)

This invention relates to new and improved freezing machines of the type commonly employed to prepare soft ice cream, milk shake preparations and the like. More specifically, it precisely relates to the control means employed in operating such machines.

Machines for preparing and dispensing soft ice cream, milk shake preparations and the like are well known at the present time. Such machines are commonly employed at small stores or stands where mechanics trained in adjusting and repairing such machines are relatively unavailable. Further, such machines are usually operated by comparatively untrained personnel. Also, such machines frequently are not used to dispense frozen products at a uniform rate. Thus, such a machine may be used to dispense a large quantity of a frozen product within a limited period, or may not be used to provide any of such a product within a comparatively long period of time.

Because of these factors a satisfactory machine for preparing and dispensing soft ice cream or other similar products must possess certain characteristics in order to be acceptable commercially. Such a machine must be capable of being easily adjusted by virtually any operator, even an untrained operator, as may be required during its use. A machine of this type must also be of a comparatively simple construction so as to facilitate both adjustment and cleaning. It must also incorporate mechanisms such that it will provide a product of a uniform consistency at virtually any rate at which it is operated.

A broad object of the present invention is to provide freezing machines of the type indicated which possess the characteristics indicated in the preceding paragraph. Another broad object of this invention is to provide new and improved freezing machines for preparing soft ice cream or similar material. A more specific object of this invention is to provide new and improved control means for such machines, which control means are adapted to be used in regulating the amount of material placed within and dispensed from a freezing cylinder in such a machine, as well as the operation of the freezing cylinder itself.

Because of the nature of this invention, it is not considered necessary to set forth in this specification a further long list of various objects and advantages of the present invention. Such other objects and advantages will be fully apparent to those skilled in the art to which the invention pertains from a detailed consideration of the remainder of this disclosure, including the appended claims and the accompanying drawings in which:

Fig. 2 is a top plan view of part of the structure shown in Fig. 1;

Fig. 3 is a side elevational view of part of the structure shown in Fig. 1; and

Fig. 4 is a wiring diagram of a circuit employed with the freezing machine shown in the preceding figures.

Figure 1:
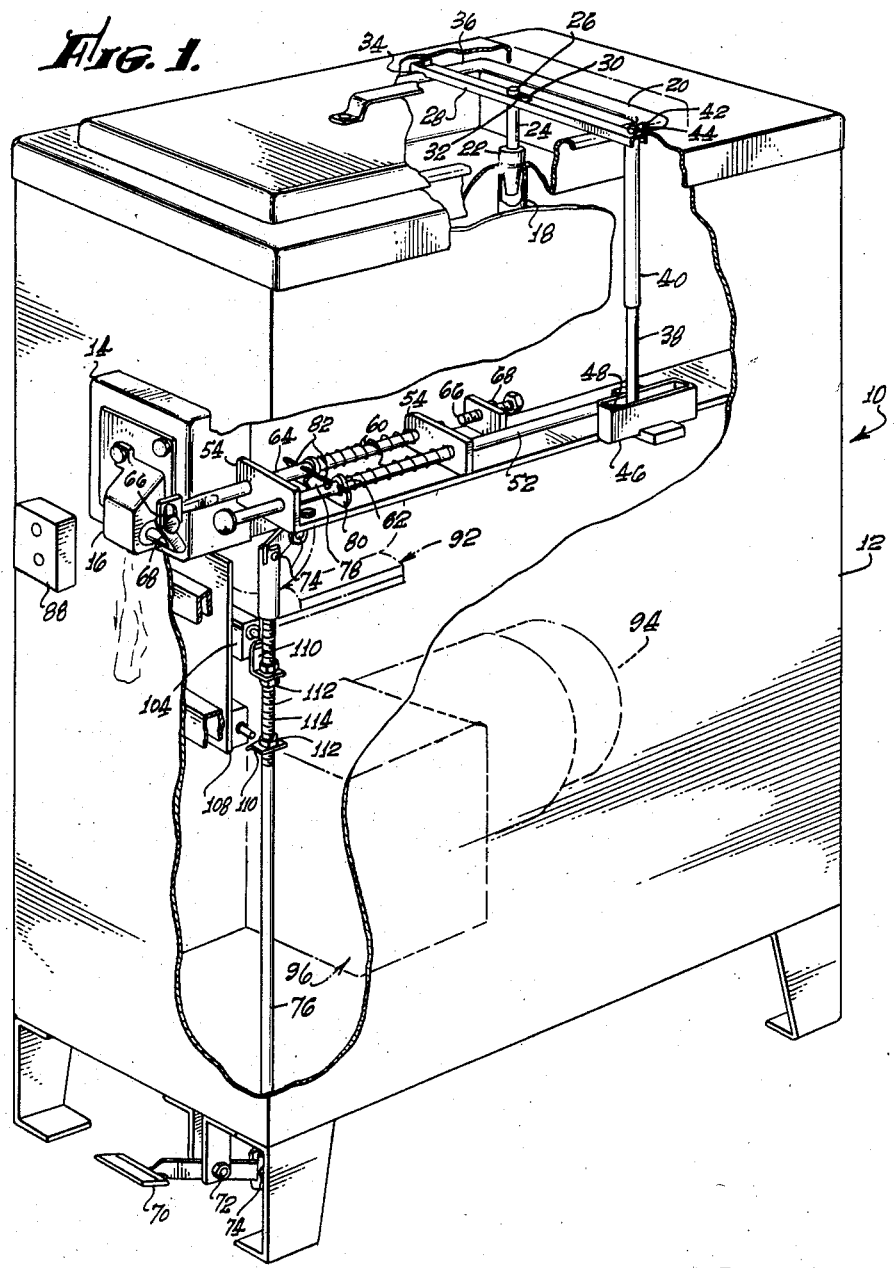
Fig. 1 is a perspective view, partially in section, of a freezing machine of this invention.

In all figures of the drawings like numerals are used to designate like parts whenever convenient for purposes of illustration and explanation. It is to be understood that this invention is not to be considered as being limited by the accompanying drawings in any respect. Those skilled in the art to which this invention pertains will realize that a large number of differently appearing freezing machines may be designed which utilize certain of the inventive features or principles of this invention, even though such other machines, or parts of them, may have a different appearance from the freezing machine illustrated.

As an aid to the understanding of this invention, it may be stated in essentially summary form that it is concerned with freezing machines, each of which includes: a freezing cylinder; means for cooling this freezing cylinder; dasher or agitator means located within this freezing cylinder; a feed tank for holding material to be introduced into the freezing cylinder; a valve for controlling the introduction of material from said feed tank into the freezing cylinder; a discharge valve for removing material from the freezing cylinder; and control means for actuating these various parts together. In its more limited aspects, the invention also concerns a novel type of lift valve as hereinafter set forth.

This invention is best explained in more detail by referring directly to the accompanying drawings where there is shown a complete freezing machine 10 of the present invention having a housing 12. Within this housing 12 there is mounted a freezing cylinder 14 serving to carry at one of its ends a discharge valve 16. The other end of this cylinder is connected by means of a feed pipe 18 to a feed tank 20 located directly above the cylinder 14. This feed pipe 18 is normally closed by a conical shaped valve body 22, which, as shown in Fig. 1, fits within the entrance to the feed pipe 18 from the feed tank 20.

The valve body 22 is attached to a hollow tube 24 which extends from above the top of feed tank 20 through this valve body and into the feed pipe 18. A small groove 26 is found on the top of the tube 24 for use in attaching this tube, and the valve body 22, to a bar 28. As can be seen in Fig. 1, this bar 28 is provided with an opening 30 leading to a slot 32 of restricted diversion so that the groove 26 may be slid within this slot 32 in attaching the tube 24 to the bar 28. The end of the bar 28 is provided with a curved groove 34 which is adapted to fit against a curved edge 36 of the feed tank 20 in such a manner that this bar may be rotated about this edge through the use of an elevating rod 38.

The elevating rod 38 is carried within a tube 40 attached to a side of the feed tank 20, and its upper end is provided with a projection 42 fitting within an opening 44 in an end of the bar 26. The other, or lower, end of the rod 38 fits within a box 46 having a cam shaped bottom surface 48. This box is movably carried within a sliding type of bearing 50. As it is moved to the right as shown in Fig. 3 of the drawings, the rod 38 is pushed up and the valve body 22 is raised, permitting material, normally a liquid ice cream preparation, to flow from the feed tank 20 into the cylinder 14. When the box 46 is returned to its starting position, the valve body 22 seats preventing such flow. At all times the tube 24 is open to the air, permitting air to be drawn into the freezing cylinder 14.

Motion of the box 46 is accomplished by means of movement of a feed control rod 52, which projects through openings in fixed bearings 54 within the housing 12.

The feed control rod 52 is provided with a knob-like end 55 extending to the outside of the housing 12 so as to permit its normal movement; it is attached to the box 46 by means of a threaded end 56 on this rod 52 fitting within a nut 58 attached to one side of the box 46. This type of connection permits the rod 52 to be easily twisted in order to regulate the amount the valve body 22 is lifted for any given amount of motion of this rod. A coil spring 60 located between a flange 62 on the rod 52 and one of the bearings 54 is normally employed to return the rod 52 to its initial position as illustrated in Fig. 3.

An actuating rod 64 is held parallel to the rod 52 by the bearings 54. An end of the rod 64 is provided with a slot 66 through which there extends an end of a handle 68 of the discharge valve 16. This slot permits longitudinal motion of the rod 64 to be converted into rotation of the handle 68 serving to open or close the valve 16. Another spring 60 located between a flange 62 on the rod 64 and one of the bearings 54 serve to normally return the rod 64 so that the valve 16 is closed. A bolt 66 located within a fixed nut 68 serves as an adjustable stop to limit movement of the rod 64 so as to provide for the desired amount of opening of the valve 16.

Both of the rods 52 and 64 are adapted to be moved together by what may be considered "control means" as hereinafter described when a foot pedal 70 is actuated. As is considered obvious from Fig. 1 of the drawings, the foot pedal 70 is rotatably carried upon a bolt 72 and is connected by a pin 74 to a machine control rod 76. The end of the rod 76 remote from the pin 74 is connected by another pin 74 to an end of a bell crank lever 78; this lever 78 is rotatably mounted on another pin 74. The end or arm of the lever 78 remote from the rod 76 extends between the rods 52 and 64 and carries a curved plate 80 having notches 82 found therein which are adapted to receive the rods 52 and 64. This plate 80 is adapted to engage the flanges 62 on the rods 52 and 64 when the pedal 70 is actuated so as to move these rods, causing the valve 16 to be opened and the valve body 22 to be moved to an open position; when the pedal 70 is released the springs 60 automatically return the rods 52 and 64, the pedal 70 and the machine control rod 76, to their initial positions.

Upon the housing 12 there is mounted a master control box 88 which carries a number of individual switches which are individually identified in Fig. 4 of the drawings. This master control box is used to supply power within the machine 10 so as to operate this entire machine. Within it there is located a switch 90 which may be used to manually operate both a dasher motor 92 and a compressor motor 94 for the purposes of operating a compressor 96 serving to supply gas cooling the cylinder 14 and to move a dasher 98 located within this cylinder in accordance with conventional practice. In addition, this control box carries an automatic-operating switch 100 which is connected directly in parallel with a temperature control switch 102 mounted on the freezing cylinder 14 and a micro switch 104 mounted within the housing 12 adjacent to the rod 76. Also, another switch 106 is provided in this control box for throwing into the circuit a time-delay switch 108. This switch 108 is also mounted within the housing 12 adjacent to the rod 76. Both of these switches, 104 and 108, are adapted to be actuated by means of projections 110 extending from nuts 112 on threaded portions 114 of the rod 76. This construction enables the actuation of these switches to be adjusted for proper machine operation with a minimum of difficulty. Also, the box 88 contains another switch 116 which is adapted to be used in actuating the dasher motor 92 separately for the purpose of cleaning the entire machine 10.

The machine 10 is normally operated with the switch 106 open. Thus whenever the pedal 70 is operated, the micro switch 104 is actuated so as to operate both the compressor and dasher motors 94 and 92. Both of these motors will operate whenever the temperature within the freezing cylinder decreases past a given predetermined point. During periods of peak operation the switch 106 may be thrown into the circuit so that the time delay switch 108 will operate to keep both the compressor and the dasher operating after the pedal 70 is released in order to provide an adequately frozen mixture within the cylinder 14.

Those skilled in the art to which this invention pertains will realize the construction herein shown and described is comparatively simple and is efficient for the purpose intended. Because of the fact that a number of these constructions may be designed which operate with the same essential features or principles as the freezing machine 10, it is to be understood this invention is to be limited only by the appended claims forming a part of this disclosure.

This application is a continuation in part of the co-pending application, Serial 444,774, filed July 21, 1954, and entitled, "Dispensing Frozen Ice Cream and Milk Shake Products."

I claim:

1. A construction which includes: a freezing cylinder having ends; a discharge valve located at one of said ends of said cylinder, said discharge valve having a handle extending therefrom; a feed tank located above said cylinder; a feed pipe leading from bottom of said feed tank into the other end of said cylinder; a valve body movably mounted so as to normally fit within said feed pipe in order to prevent the contents of said feed tank from moving into said cylinder; a tube extending through said valve body from the interior of said feed pipe to the top of said feed tank, said tube being attached to said valve body; a bar positioned across the top of said feed tank so that one end of said bar is rotatably held with respect to said feed tank, said bar being attached to said tube; linking means attached to said handle on said discharge valve; cam surface means attached to said linking means; and elevating means attached to the end of said bar, said elevating means engaging said cam surface means whereby when said discharge valve is actuated, said bar is caused to rotate, moving said valve body so as to permit the contents of said feed tank to move into said freezing cylinder.

2. A construction which includes: a freezing cylinder having ends; a discharge valve located on said cylinder; a feed tank located above said cylinder; a said pipe leading from the bottom of said feed tank into said cylinder; a valve body movably mounted so as to normally fit within said feed pipe in order to prevent the contents of said feed tank from moving into said cylinder; a tube extending through said valve body from the interior of said feed pipe to the top of said feed tank, said tube being attached to said valve body; a bar positioned across said feed tank so that one end of said bar is rotatably held with respect to said feed tank, said bar being attached to said tube; an elevating rod engaging the other end of said bar; a feed control rod movably mounted adjacent to said freezing cylinder; and a cam surface attached to said feed control rod whereby when said feed control rod is moved said cam surface is moved, causing said elevating rod to be moved by engagement with said cam surface, moving in said valve body so as to permit material from said feed tank to move into said freezing cylinder.

3. A construction which includes: a freezing cylinder having ends; a discharge valve located on said cylinder; a feed tank located above said cylinder; a feed pipe leading from the bottom of said feed tank into said cylinder; a valve body movably mounted so as to normally fit within said feed pipe in order to prevent the contents of said feed tank from moving into said cylinder; a tube extending through said valve body from the interior of said feed pipe to the top of said feed tank, said tube being attached to said valve body; a bar positioned across said feed tank so that one end of said bar is rotatably held with respect to said feed tank, said bar being attached to said tube; an elevating rod engaging the other end of said bar; a feed control rod movably mounted adjacent to said freezing cylinder; a cam surface attached to said feed control rod whereby when said feed control rod is moved said cam surface is moved, causing said elevating rod to be moved by engagement with said cam surface, moving said valve body so as to permit material from said feed tank to move into said freezing cylinder; and means connecting said discharge valve with said feed control rod whereby when connecting means are actuated said feed control rod is moved and said discharge valve is simultaneously actuated.

4. A construction which includes: a freezing cylinder having ends; a discharge valve located on said cylinder; a feed tank located above said cylinder; a feed pipe leading from the bottom of said feed tank into said cylinder; a valve body movably mounted so as to normally fit within said feed pipe in order to prevent the contents of said feed tank from moving into said cylinder; a tube extending through said valve body from the interior of said feed pipe to the top of said feed tank, said tube being attached to said valve body; a bar positioned across said feed tank so that one end of said bar is rotatably held with respect to said feed tank, said bar being attached to said tube; an elevating rod engaging the other end of said bar; a feed control rod movably mounted adjacent to said freezing cylinder; a cam surface attached to said feed control rod whereby when said feed control rod is moved said cam surface is moved, causing said elevating rod to be moved by engagement with said cam surface, moving said valve body so as to permit material from said feed tank to move into said freezing cylinder; an actuating rod attached to said discharge valve; a machine control rod movably mounted so as to terminate adjacent to said feed control rod; and rod actuating means attached to said machine control rod for simultaneously moving said feed control rod and said actuating rod.

5. A construction which includes: a freezing cylinder having ends; a discharge valve located on said cylinder; a feed tank located above said cylinder; a feed pipe leading from the bottom of said feed tank into said cylinder; a valve body movably mounted so as to normally fit within said feed pipe in order to prevent the contents of said feed tank from moving into said cylinder; a tube extending through said valve body from the interior of said feed pipe to the top of said feed tank, said tube being attached to said valve body; a bar positioned across said feed tank so that one end of said bar is rotatably held with respect to said feed tank, said bar being attached to said tube; an elevating rod engaging the other end of said bar; a feed control rod movably mounted adjacent to said freezing cylinder; a cam surface attached to said feed control rod whereby when said feed control rod is moved said cam surface is moved, causing said elevating rod to be moved by engagement with said cam surface, moving said valve body so as to permit material from said feed tank to move into said freezing cylinder; an actuating rod attached to said discharge valve; a machine control rod movably mounted so as to terminate adjacent to said feed control rod; rod actuating means attached to said machine control rod for simultaneously engaging and moving said feed control rod and said actuating rod; when said machine control rod is moved; pedal means for moving said machine control rod; means for cooling said freezing cylinder; dasher means located within said freezing cylinder; switch means actuated by said machine control rod when said machine control rod is moved for simultaneously actuating said means for cooling said freezing cylinder and said dasher means; and other switch means actuated by motion of said machine control rod for actuating said means for cooling said freezing cylinder after said machine control rod has been actuated.

References Cited in the file of this patent

UNITED STATES PATENTS

| | | |
|---|---|---|
| 2,474,730 | Espinasse | June 28, 1949 |
| 2,488,668 | Knibb | Nov. 22, 1949 |
| 2,559,032 | Tacchella | July 3, 1951 |
| 2,561,836 | Anderson | July 24, 1951 |
| 2,619,117 | Stranak | Nov. 25, 1952 |
| 2,737,024 | Swenson | Mar. 6, 1956 |
| 2,740,264 | Thompson | Apr. 3, 1956 |